United States Patent
Winkel et al.

(10) Patent No.: US 7,935,024 B2
(45) Date of Patent: May 3, 2011

(54) METHOD FOR OPERATING AN AUTOMATIC GEARBOX ON A MOTOR VEHICLE

(75) Inventors: Matthias Winkel, Weingarten (DE); Bertram Wengert, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 441 days.

(21) Appl. No.: 10/566,620

(22) PCT Filed: Jul. 6, 2004

(86) PCT No.: PCT/EP2004/007345
§ 371 (c)(1),
(2), (4) Date: Jan. 30, 2006

(87) PCT Pub. No.: WO2005/018978
PCT Pub. Date: Mar. 3, 2005

(65) Prior Publication Data
US 2006/0240943 A1    Oct. 26, 2006

(30) Foreign Application Priority Data
Jul. 31, 2003 (DE) ................. 103 34 930

(51) Int. Cl.
*B60W 10/02* (2006.01)
*B60W 10/04* (2006.01)
(52) U.S. Cl. .......... 477/80; 477/185; 477/186; 477/903
(58) Field of Classification Search .......... 477/74, 477/75, 77, 78, 80, 183, 184, 185, 186, 187, 477/199, 200, 203, 209, 902, 903; 180/338, 180/364; 192/3.61, 3.63, 220
See application file for complete search history.

(56) References Cited

U.S. PATENT DOCUMENTS

| | | | |
|---|---|---|---|
| 4,605,112 A | | 8/1986 | Takano |
| 4,685,062 A | | 8/1987 | Uriuhara et al. |
| 5,048,650 A | * | 9/1991 | Takizawa .................. 477/92 |
| 5,054,336 A | * | 10/1991 | Takizawa .................. 477/119 |
| 5,069,085 A | * | 12/1991 | Iizuka ...................... 477/119 |
| 5,161,432 A | * | 11/1992 | Matsumoto et al. ....... 477/119 |
| 5,577,978 A | * | 11/1996 | Stasik et al. .............. 477/78 |
| 5,842,952 A | * | 12/1998 | Onimaru et al. .......... 477/174 |
| 6,009,768 A | * | 1/2000 | Hoshiya et al. ........... 74/336 R |
| 6,019,699 A | * | 2/2000 | Hoshiya et al. ........... 477/20 |
| 6,231,474 B1 | * | 5/2001 | Hawarden et al. ......... 477/94 |
| 6,415,214 B2 | | 7/2002 | Nishimura et al. |
| 6,497,635 B2 | * | 12/2002 | Suzuki ..................... 477/3 |
| 6,971,275 B2 | * | 12/2005 | Nitta ....................... 74/335 |
| 7,621,844 B2 | * | 11/2009 | Kishi ....................... 477/120 |
| 2004/0106495 A1 | * | 6/2004 | Abusamra et al. .......... 477/70 |

FOREIGN PATENT DOCUMENTS

| | | |
|---|---|---|
| DE | 38 31 449 A1 | 3/1990 |
| DE | 43 02 500 A1 | 8/1993 |
| DE | 198 23 764 A1 | 12/1998 |
| EP | 0601741 A1 * | 6/1994 |

* cited by examiner

*Primary Examiner* — Roger Pang
(74) *Attorney, Agent, or Firm* — Davis & Bujold, P.L.L.C.

(57) ABSTRACT

A method for the operation of an automatic transmission in a motor vehicle. The downshifting of the transmission takes advantage of a braking action of a driving motor connected to the automatic transmission through a clutch, are terminated by the closing of a clutch during a compression phase lasting until the achievement of a predetermined threshold speed. For the improvement of the immediacy of the vehicle drive after the termination of the compression phase, the invention provides that at speeds less than the threshold speed, downshifting is carried out and is terminated with an open clutch.

13 Claims, 1 Drawing Sheet

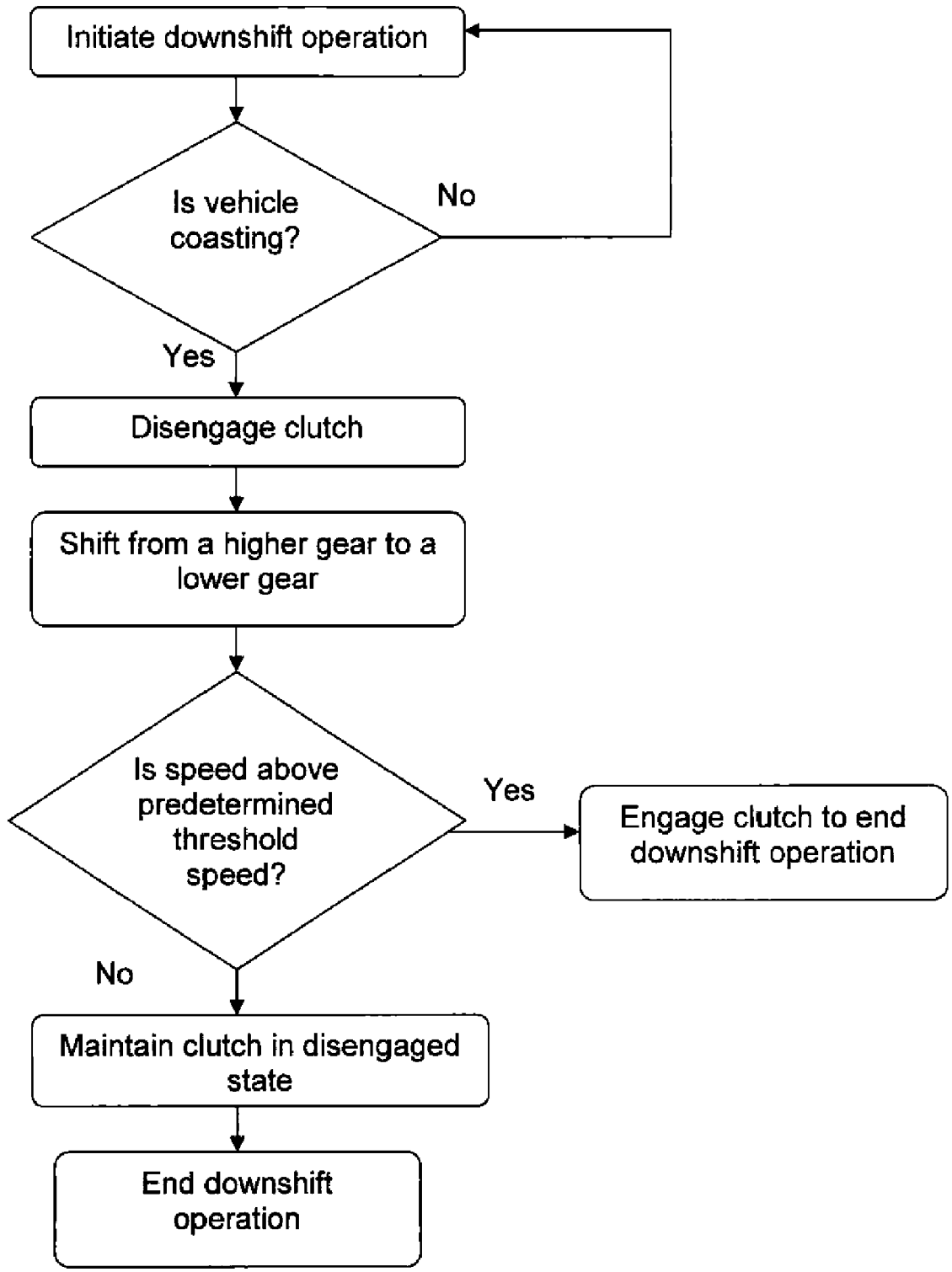

METHOD FOR OPERATING AN AUTOMATIC GEARBOX ON A MOTOR VEHICLE

This application is a national stage completion of PCT/EP2004/007345 filed Jul. 6, 2004 which claims priority from German Application Serial No. 103 34 930.8 filed Jul. 31, 2003.

FIELD OF THE INVENTION

The invention concerns a method for the operation of an automatic transmission on a motor vehicle.

BACKGROUND OF THE INVENTION

A multiplicity of methods is known to experts with regard to the operation of automatic transmissions. In the present case, the emphasis is on controlling problems involved with such transmissions, which occur especially in connection with compression downshifting. In the case of compression downshifting of the type pertinent here, during a continual reduction of speed of an unpowered, but still traveling vehicle, i.e., coasting against the compression of the motor, shifting is carried out from high transmission gearing to a succession of lower gearings. To accommodate this action, in an already known manner, regulated actuators are energized by a transmission control apparatus, wherein actuators select the succession of gear stages and also can activate shifts into a starting clutch as well as a cut-out clutch in the transmission.

Compression downshifting is particularly of value in descents from mountains to take advantage of the braking torque of a vehicle motor so that, simultaneously, the operational brakes of the vehicle need not be too severely loaded. In addition, by way of a choice of transmission gearing, which is compliant with the actual speed, assurance is provided that at the termination of the coasting phase, while the clutch is closed, the correct gear is found to be engaged, which will serve well for a continuing positive vehicle acceleration.

Moreover, in normal operation of a motor vehicle, it is possible for a driving situation in which this downshifting can occur to achieve a continually reduced driving speed when approaching a traffic blockage, a suddenly closed railroad crossing or a traffic light which has turned red. During such an operational phase, it may happen that engine braking torque, in a case of a suddenly engaged small gear stage, would produce a stopping power far in excess of that required.

On the account of the above, in the case of multi-stage, automatic transmissions, frequent downshifting while coasting into compliant speed related gear stages is not actually carried out, in the case of downshifting while running against motor compression. In order not to allow the high motor compression braking torque in the low gear stages to react adversely on the vehicle in such transmissions, compression downshifting into the smaller gears can only be permitted up to the time that a predetermined threshold vehicle speed has been attained. Below this speed limitation, the most recently engaged gear (most likely a high gear) is kept closed and the driving speed in this gear is further reduced by the closed clutch.

Upon attaining an idling speed of rotation of the driving motor, the clutch is opened in order to prevent stalling. The vehicle then rolls with the open clutch and in a high gear stage until the vehicle comes to a stillstand and subsequently the proper starting clutch is engaged.

However, if the vehicle does not come to a standstill because at that moment, a traffic light suddenly turns green, for example, by subsequent activation of the power control member of the drive motor, a downshift is enacted from the presently engaged high transmission gear stage into such a gear stage as enables further travel in accordance with its complementary driving speed.

This mode of driving brings with it a disadvantage of the operation of an automatic transmission, namely that a relatively long time must pass to achieve the release of the former gear, to engage the new gear, close the clutch and have the vehicle react with the desired acceleration.

Giving consideration to this background and in a case of a compression downshifting, it is the purpose of the invention to introduce a method for the control of an automatic transmission by way of the operation of which a subsequent immediate continuation of travel is always achieved by an appropriate gear stage in the transmission without having to take into consideration a disadvantage of excessive motor torque at low driving speeds and high transmission ratios in low gear stages.

SUMMARY OF THE INVENTION

BRIEF DESCRIPTION OF THE DRAWING

The sole FIGURE shows the method of operating an automatic transmission of a motor vehicle, according to the present invention, having a clutch located between a drive motor and the transmission.

The invention bases itself on a method for the operation of an automatic transmission in a motor vehicle wherein, while a coasting operational phase is carried out until the reaching of a predetermined threshold speed, whereupon the phase is ended by closing the clutch. At speeds less than this threshold speed, however, an exclusion is placed on downshifting carried out with an open clutch so that the driving speed is established and/or that gear stage is engaged, which is in accordance with the driving conditions at that particular time. Continuous travel with a positive driving torque can be achieved in the shortest possible time. The open clutch, related to the downshifting in speeds less than the predetermined threshold speed, additionally, assures no brake torque will be generated by the drive motor in spite of engaged low transmission gear stages which is, for example, an internal combustion machine.

The threshold speed is a vehicle specific value which, among other things, is dependent upon the respective gear ratios of the individual gear stages.

Accordingly, counter to the state of the technology, below the stated threshold value for speed, additional downshifting can take place during coasting. In the case of these so-called comfort downshifts, however, the clutch is not closed after the engagement of a new gear, but is left in an open state. When this is done, the negative effect of the motor braking action being too strong, which is known to the state of the technology, does not occur. In this operation, the gear jumps were fortunately chosen with consideration given to the vehicle delay which, for example, is determined by the measurement of the change of the transmission output shaft speed of rotation.

If the driver desires to continue driving and signals this intent, after a positive drive torque to the transmission control apparatus by means of a release of the power control member of the vehicle, then the clutch is immediately closed. Since the gear stage, which is already in keeping with the speed of driving, is already engaged, the driver experiences the desired vehicle acceleration without any marked time delay.

In order to avoid wear on the components of the transmission, as well as preventing unnecessarily increased downshifts with the clutch, an advantageous embodiment of the invention provides that these downshifts are only executed at speeds less than the threshold speed when, after a positive input drive torque for a preselected time period, a continuity of travel and an attendant driver desire therefor are to be assumed as reasonably probable.

In one embodiment of this method, provision can be made for the determination of the probability of the driver's wish, for a positive input drive torque, a number of different indications can be put to use.

One such indicator, as an example, could be a sensor signal with which the activation of the operational brake is signaled. As long as the driver actuates the operational brakes, then no comfort downshifting can occur. Only when the driver releases the operational brake, i.e., frees perhaps a brake pedal of the vehicle, would the comfort downshifting take place with a continually open clutch.

The observation of the brake activation, in this respect, is particularly appropriate, since the driver, for the actuation of the power control member, normally removes his foot from the brake pedal. In this way, the driver would roll into a red flashing traffic signal, brake his vehicle by the activation of the brake pedal and, upon a change of the traffic signal to green, the driver would release the pedal for the operating braking in order to make an unbroken movement of travel possible.

If the driver then subsequently activates the power control member then, up to this point in time, the correct gear stage has been engaged with regard to the circumstances of driving speed and driving conditions, in order to either drive out of a blocked position or possibly renew the travel conditions at a comparatively low speed. By the activation of the power control member, not only would the clutch be closed, but the continued travel would be immediately possible.

In accordance with two other variations of the invention, it is possible that signals can be used as indicators for the determination of the driver's wish for a positive drive torque and also to initiate the termination of the coasting mode. Further, signals can be used to characterize the positioning for the activation levers of the direction of travel indicator and/or to compare an overstepping of the angle of the vehicle steering in relation to a predetermined angle of steering.

With knowledge of the invention, it is easily understandable to the expert, particularly in that a comparatively greater steering angle, in connection with the existing vehicle delay, can be directly attributed to the wish of the driver and, that at the termination of a turning procedure, an uninterrupted continuation of travel should take place.

Somewhat weaker in indicative power, but nevertheless advantageous in this matter, is the positioning of the placing of the activation lever for the direction of travel indicator since this, as is known, is disengaged if the vehicle is decelerated for parking on the edge of the roadway.

Accuracy of analytical results in the behavior of the driver, with respect to his desire for driving torque can clearly increase itself, if two or more of the named or other indicators are commonly used.

Of particular advantage of the use of an indicator for the determination of the desire of a driver for a positive input drive torque is, that thereby the frequency of shifting during compression downshifting can be clearly reduced, thus also reducing component wear.

A further improvement of the operation of an automatic transmission is to be found therein, that the engagement of the starting gear of the automatic transmission at the end of a coasting mode is always ended with an open clutch, insofar as only this gear stage enables continuity of travel.

The expert, in his knowledge of the invention, sees it as obvious that the control procedure is stored as software in a transmission control apparatus. This transmission control apparatus is connected by way of control lines with actuators for the energizing of the clutch and for the selection and engagement of the transmission gears. Additionally, the transmission control apparatus is technologically connected for signaling with sensors, from the data of which, can be computed by rate of rotation of the transmission input, transmission output, actuation of the operative brakes, actuation of the power adjustment member and the direction of travel indicator lever as well as the steering angle of the vehicle.

The invention claimed is:

1. A method of operating an automatic transmission of a motor vehicle having a clutch located between a drive motor and the transmission, the method comprising the steps of:
   disengaging the clutch, if engaged, and initiating a first downshift operation only when the vehicle is currently coasting;
   shifting from a first, higher transmission gear ratio to a second, lower transmission gear ratio during coasting while the clutch is disengaged:
   completing the first downshifting operation by engaging the clutch if a speed of the vehicle is above a predetermined threshold speed greater than zero determined by the second transmission gear ratio; or
   completing the first downshifting operation while maintaining the clutch in a disengaged state if the speed of the vehicle is below the predetermined threshold speed.

2. The method according to claim 1, further comprising the step of performing a second downshifting operation, while the clutch remains continually disengaged, if both a reasonably great probability exists that a driver has a desire for positive drive torque as well as desiring uninterrupted travel, and the first downshifting operation is completed while the clutch is disengaged.

3. The method according to claim 2, further comprising the step of determining the desire for positive drive torque by an indicator.

4. The method according to claim 2, further comprising the step of indicating the desire for the positive drive torque by one or more of:
   releasing operative brakes of the vehicle,
   deflecting an activation lever for a direction of travel, and
   using a steering angle of a vehicle steering mechanism.

5. The method according to claim 2, further comprising the steps of indicating the desire for the positive drive torque by using a steering angle of a vehicle steering mechanism and determining the desire for the positive drive torque by way of overstepping of the steering angle as compared to a predetermined steering angle.

6. The method according to claim 2, further comprising the step of using, for a determination of the probability of the driver's wish for the positive torque, two or more of named indicators.

7. The method according to claim 1, further comprising the step of preventing the downshifting operation if operational brakes of the vehicle are activated.

8. The method according to claim 1, further comprising the step of engaging the clutch when the speed of the vehicle is above the predetermined threshold speed, to complete the downshifting operation, only when a power control member of the motor vehicle is activated.

9. The method according to claim 1, further comprising the step of always completing engagement of a gear of the automatic transmission at the end of the downshifting operation with a disengaged clutch when the current gear of the automatic transmission is a starting gear.

10. The method according to claim 1, further comprising the step of selecting a next gear for a downshift dependent on vehicle deceleration.

11. A method of operating an automatic transmission of a motor vehicle, the method comprising the steps of:
(a) initiating a first downshifting operation, only when the vehicle is currently coasting, from a first, higher transmission gear ratio to a second, lower transmission gear ratio during coasting, by:
   disengaging a clutch located between the automatic transmission and a vehicle engine;
   shifting from the first, higher transmission gear to the second, lower transmission gear ratio in the automatic transmission; and
one of:
(b1) completing the first downshifting operation by engaging the clutch if a speed of the vehicle is above a predetermined threshold speed greater than zero determined by the second transmission gear ratio so that engine compression influences the vehicle; or
(b2) completing the first downshifting operation while maintaining the clutch in a disengaged state if the speed of the vehicle is below the predetermined threshold speed;
detecting a vehicle speed of the vehicle:
(c) if the vehicle speed continues to decrease, carrying out a second downshifting operation of the automatic transmission by
   disengaging the clutch, if engaged,
   downshifting from the lower gear to a first next lower gear in the automatic transmission:
(d1) completing the second downshifting operation by engaging the clutch if a speed of the vehicle is above the predetermined threshold speed so that engine compression influences the vehicle; or
(d2) completing the second downshifting operation while maintaining the clutch in the disengaged state if the speed of the vehicle is below the predetermined threshold speed; and
determining a driver's desire for positive drive torque; and terminating the second downshifting operation by engaging the clutch.

12. The method according to claim 11, further comprising the step of determining the driver's desire for positive drive torque by identifying at least one of:
   releasing operative brakes of the vehicle,
   deflecting an activation lever for a direction of travel; and
   a predetermined steering angle of a vehicle steering mechanism; and
   activation of a power control member.

13. A method of operating an automatic transmission of a motor vehicle driven by an engine, the method comprising the steps of:
(a) entering a vehicle coasting mode, in which the vehicle is coasting without any power being supplied by the engine,
   disengaging a clutch, if engaged, located between a vehicle drive motor and the transmission;
   performing a first downshift from a higher transmission gear ratio to a next lower transmission gear ratio of the automatic transmission;
(b1) re-engaging the clutch with the next lower transmission gear ratio to complete the first downshift if a speed of the vehicle is above a predetermined threshold speed greater than zero determined by the next lower transmission gear ratio; or
(b2) maintaining the clutch in a disengaged state with the next lower gear to complete the first downshift if a speed of the vehicle is below the predetermined threshold speed; and
(c) if the speed of the vehicle continues to decelerate after the first downshift, then:
   disengaging the clutch, if the clutch is engaged;
   performing a second downshift from the next lower transmission gear ratio to a second next lower transmission gear ratio, and
(d1) re-engaging the clutch with the second next lower transmission gear ratio to complete the second downshift, if a speed of the vehicle is above the predetermined threshold speed; or
(d2) maintaining the clutch in the disengaged state with the second next lower transmission gear ratio to complete the second downshift, if a speed of the vehicle is below the predetermined threshold speed.

* * * * *